US008555204B2

(12) United States Patent
Casado et al.

(10) Patent No.: US 8,555,204 B2
(45) Date of Patent: Oct. 8, 2013

(54) INTUITIVE DATA VISUALIZATION METHOD

(75) Inventors: Angel Rivas Casado, Vizcaya (ES); Jose Luis Real de Asua Llona, Vizcaya (ES)

(73) Assignee: Arcoinet Advanced Resources, S.L., Vizcaya (ES)

( * ) Notice: Subject to any disclaimer, the term of this patent is extended or adjusted under 35 U.S.C. 154(b) by 283 days.

(21) Appl. No.: 13/070,557

(22) Filed: Mar. 24, 2011

(65) Prior Publication Data
US 2012/0246599 A1    Sep. 27, 2012

(51) Int. Cl.
*G06F 3/048*    (2013.01)
(52) U.S. Cl.
USPC ........... 715/848; 715/835; 345/467; 345/473; 707/705; 707/748; 707/805
(58) Field of Classification Search
USPC .......... 715/700, 64, 765, 835, 848, 976, 977; 345/419, 467, 473; 707/705, 748, 754, 707/802–805
See application file for complete search history.

(56) References Cited

U.S. PATENT DOCUMENTS

| | | | |
|---|---|---|---|
| 6,359,622 B1 * | 3/2002 | Hayes-Roth | 345/474 |
| 7,593,014 B2 * | 9/2009 | Oyamada et al. | 345/473 |
| 8,134,560 B2 * | 3/2012 | Bates et al. | 345/474 |
| 2007/0050715 A1 * | 3/2007 | Behar | 715/706 |
| 2008/0165186 A1 * | 7/2008 | Lin | 345/419 |
| 2008/0246757 A1 * | 10/2008 | Ito | 345/419 |
| 2010/0185640 A1 * | 7/2010 | Dettinger et al. | 707/758 |
| 2013/0027409 A1 * | 1/2013 | Indelicato et al. | 345/473 |

* cited by examiner

*Primary Examiner* — Xiomar L Bautista
(74) *Attorney, Agent, or Firm* — Notaro, Michalos & Zaccaria P.C.

(57) ABSTRACT

A computer software program, method and system has a data visualization scheme in the form of plural identifiable virtual characters in a familiar virtual environment that is relevant for the characters and in which the characters act in the context of the environment and in a manner that is indicative of the data or data set portrayed by each character. From the actions and interactions of the virtual characters in the context of the virtual environment, information about the nature and interactions of the data and data sets is quickly and intuitively appreciated by a viewer.

18 Claims, 8 Drawing Sheets

INTUITIVE DATA VISUALIZATION METHOD

FIELD AND BACKGROUND OF THE INVENTION

The present invention relates generally to the field of computer programs and in particular, to a new and useful computer software program, method and system that creates a data visualization scheme that allows a viewer to quickly and accurately appreciate and assess the nature and interaction of the data.

Throughout human history, many schemes have been used to display data. From the use of hieroglyphics to list grain stores on clay tablets in ancient Egypt to the computer generation of animated graphs and charts, there has always been a desired for accuracy and ease of understanding. To date, however, the tabulation and display of data has followed the same basic tenet of collection and presentation in a list, graph or chart of various types.

In view of the ever increasing amounts and types of data that are displayed to viewers in the business, scientific, engineering, medical, political, social, and other arenas, a need exists for a unique scheme for visualizing data that quickly conveys the essence of the data to the viewer.

SUMMARY OF THE INVENTION

In a complex environment, with aggressive competition and floods of information, rational analysis is not enough. It takes too much time and too many resources for results that are often rather predictable.

The human brain, however, is also capable of intuition. A human quality that is quickly executed, without conscious effort, and which helps detect hidden problems by synthesizing isolated data and experiences in an integral image. Traditional data analysis and visualization tools do not train or exploit this unconscious intelligence that all humans have.

The present invention allows users to analyze data from both perspectives, the rational and the intuitive. This provides the user with the following clear advantages when compared to the existing state of the art, visualization schemes:

it helps in the making of quicker, but safee, decisions;

it overcomes the need for lengthy and costly in depth analysis; and it trains user's unconscious intelligence and helps him or her compare his rational analysis with his or her intuitive knowledge.

It is an object of the present invention to provide a computer software program, method and system that creates a data visualization scheme in the form of plural identifiable virtual characters in a familiar virtual environment that is relevant for the characters, and in which the characters look and/or act in the context of the environment and in a manner that is indicative of the data being portrayed by each character, so that the viewer can quickly and intuitively appreciated the nature and interaction of the data.

The invention is a system, a method and a computer program for data visualization, which allows association of any group, category or entity of data with one, or various, virtual characters, which act according to the regular dynamics of an intuitive recognizable situation in an environment of simulated reality. This is done via a specific dynamic data processing matrix that converts and associates an entity of data, of any nature, with variables referred to how a virtual character (that represents such entity) will behave in the dynamics of such a recognizable situation.

In this way, the invention gives a solution to the problem of agility and accuracy in data analysis and decision making in the business, engineering, scientific, medical, political, social or other arenas. This is because, by means of the invention, it is possible to convert data into evolutions of well known conventional events and allows the user or viewer to infer, intuitively, information about such data by following the logic of the evolution of the characters that represent it in the event that its being simulated. By means of this metaphor, and without sacrificing accuracy, the human brain can synthesize hidden information, interactions and relationships about the data much quicker than how it would do that with other data analysis applications.

The system is composed by three main modules that work with a data source and a graphic output, namely:

1. A module that interfaces with the input data, here called an Importer (B.);
2. A module that processes the Dynamic Data Processing Matrix, or DDPM (C.); and
3. A module of simulated reality, or Scenario (D.).

An data source or input (A.) Data Source of the system is data or data sets, that is or are indexed or not, and is from any source, e.g. a data base, a mobile phone, a sensor, etc., and the output (E.) or Intuitive Output, is a dynamical graphical representation of a certain event (a game, a sports event, a social event, etc.) in a simulated environment (a table, a stadium, a theater, etc.) where different virtual characters that represent the input data (players, athletes, avatars, etc.) interact between themselves and/or with the environment, displayed on a suitable video display such as a computer screen, a smart phone display, a PDA display or any other known video viewing device.

How the virtual characters will interact is how the user will infer information about the input data. For example, the output (E.) could be an SW file that could be displayed in a computer by means of a standard graphical or video display application. An SW file or SWF (Small Web Format) is the file format for playing Flash animation files (Flash movies). The Flash source file, which holds the timelines and multimedia elements, uses the .FLA (Flash Authoring) extension and is published to an .SWF file for playback by the Flash media player.

Accordingly, another object of the invention is to provide a method for graphically displaying a plurality of related data sets of a database to a viewer, comprising: generating a plurality of virtual characters for a virtual environment, each virtual character having an attribute or performing at a level in a context of the virtual environment that is indicative of one data set so that each of the data sets is portrayed by a virtual character, and causing the virtual characters to perform in the virtual environment for graphically displaying the data sets, the viewer viewing the attributes or performances or both, of the virtual characters to access and assess information about the data sets and interactions between the data sets, that may not be readily appreciated by looking at a graph or chart displaying the same data.

A further object of the invention is to provide a computer program for data visualization, the program being stored in a memory such as a memory medium, a computer, or a website, the program comprising an import module for importing data sets from the data source, a dynamic data processing matrix module connected to the import module for processing the data sets for application to virtual characters of a virtual environment for visually representing the data sets, a scenario module for generating the virtual characters and the virtual environment so that the virtual characters each have at least one of an attribute and a performance in the context of the virtual environment that is indicative of a data set portrayed by each character respectively, and a graphic output for visually portraying the virtual characters with their attributes and performing in the context of the virtual environment, so that information about the data sets nature and interactions between the data set can be quickly and intuitively appreciated by a viewer of the graphic output.

A still further object of the invention is to provide a system for data visualization, comprising an import module for importing data sets from the data source, a dynamic data processing matrix module connected to the import module for processing the data sets for application to virtual characters of a virtual environment for visually representing the data sets, a scenario module for generating the virtual characters and the virtual environment so that the virtual characters each have at least one of an attribute and a performance in the context of the virtual environment that is indicative of a data set portrayed by each character respectively and a graphic output for visually portraying the virtual characters with their attributes and performing in the context of the virtual environment, so that information about the data sets nature and interactions between the data set can be quickly and intuitively appreciated by a viewer of the graphic output.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
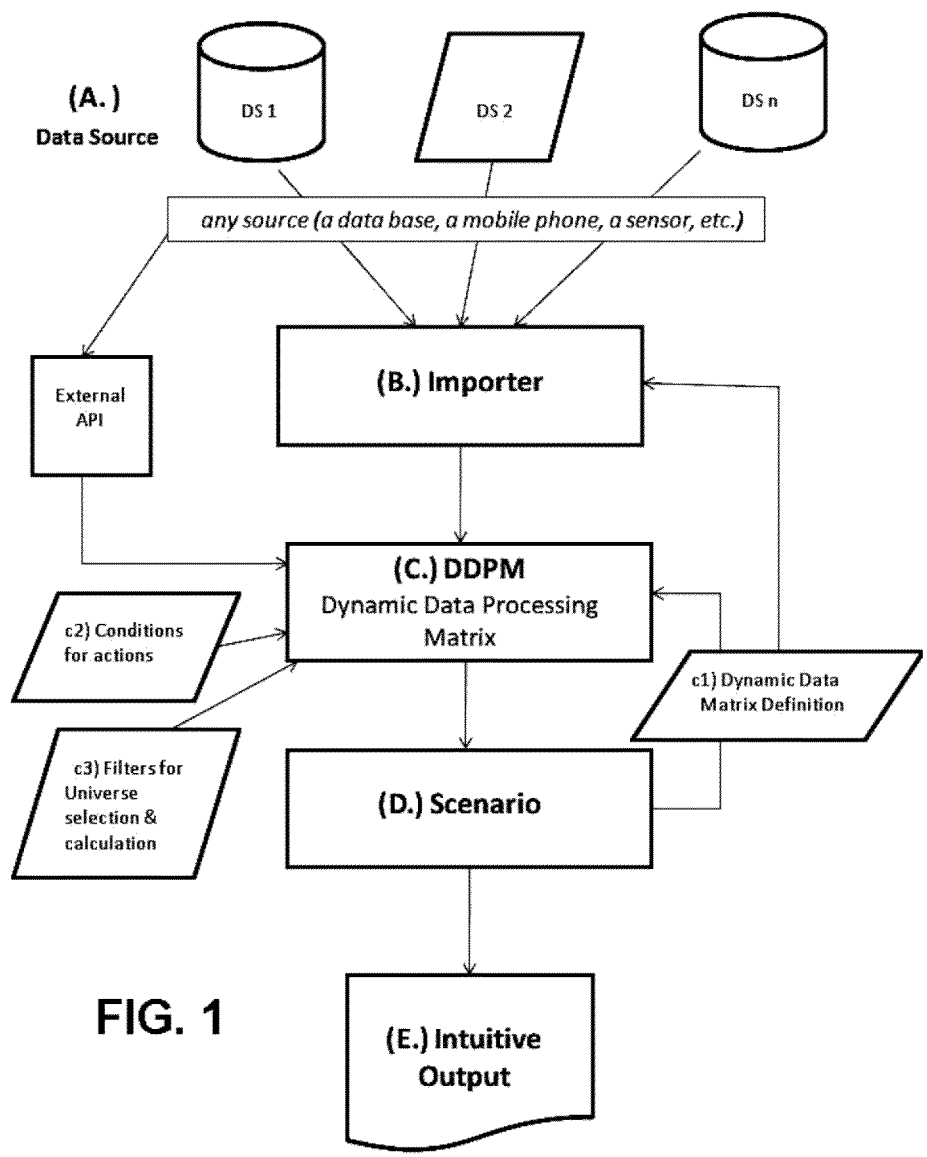
FIG. 1 is a flow chart showing the overall operation of the invention.

Referring now to the drawings, in which like reference labels are used to refer to the same or similar elements, FIG. 1 shows the overall operational flow of the invention for an exemplary application as a system for business Intelligence.

In this system, the input data (A.) is a set of data bases where information referred to business indicators, for example, Seller IDs, margins and sales figures for a specific period of time for a certain business, are stored as DS1, DS2, to DSn.

The output (E.) is a graphical representation of a foot race (the virtual or recognizable event) where runners (each representing an entity that mixes the variables Seller ID, margin, sales figure and time) compete (interact) on a race track (the simulated or virtual environment). FIGS. 5 to 8 are examples of display snapshots of this virtual environment.

The invention is thus a computer program, a method and a system that is stored in a memory, like a memory medium, a memory of a computer, including portable electronic device CPUs, or a website memory, for visualization of data sets from a data source (A.), the invention comprising an import module (B.) for importing data sets from the data source, a dynamic data processing matrix module (C.) connected to the import module for processing the data sets for application to virtual characters of a virtual environment for visually representing the data sets, a scenario module (D.) connected to the matric module for generating the virtual characters and the virtual environment so that the virtual characters each have at least one of an attribute and a performance in the context of the virtual environment that is indicative of a data set portrayed by each character respectively, and a graphic output (E.) connected to the scenario module for visually portraying the virtual characters with their attributes and performing in the context of the virtual environment, so that information about the data sets nature and interactions between the data set can be quickly and intuitively appreciated by a viewer of the graphic output.

In this application of the invention, the modules in the invention will fulfill the following functions:

The module that interfaces with the input data, (B.), will receive the incumbent data from the database (DS1, DS2, . . . DSn), pre-process it and send it to the DDPM module (C.).

The DDPM module (C.) then processes the data set it receives from the data from module (B.), into a dynamic data processing matrix, and, together with the environmental constraints set by module (D.) and the pre-definition of the dynamics of the race set by the user, associates entities of the input data with specific runners in the race and with specific ways of interacting of these runners while the race takes place.

For example, a runner will run quicker or slower depending on sales figure values, flash if margin is above or below a certain threshold, get bigger if margin and sales figure both fulfill a certain condition, jump because of some other factor in the data set, etc. Module (C.) processes all this info into a specific data file that is readable by the simulated reality module (D.).

The module of simulated reality (D.), then receives this info from module (C.) and generates an output file (E.), such as a video file, a flash file, etc., that is readable by a display computer program and displayed in as computer or other electronic monitor as schematically shown in FIGS. 5 to 8.

In this way, by actually seeing all this data "running" in a very familiar scenario (a race between runners to whom something happens as they run or who look a certain way compared to the other runners), the user visualizes all this business data in a way, a race, that allows very rapid interpretation of what has happened during a certain period in terms of sellers activity, obtained turnover, margins, etc., and, also, very quickly sees interrelationships between all these variables and can therefore make decisions and detect hidden incidences and information accordingly. In other words, this tool takes advantage of user's instinctive knowledge to help him or her make rational decisions about his/her business based on data that has, in effect, come alive.

These 'running' entities could be any: customers, departments, KPIs in a project, medical variables, stock values, political results, statistical data, etc., or any mix between them.

In further detail and with reference to FIGS. 1 to 4, the modules of the invention operate as follows.

TABLE 1

| c1) Definition of the Dynamic Data Matrix (DDM) | | | |
|---|---|---|---|
| Data Set 1 | Data Set 2 | ... | Data Set n |
| Entry Code | Entry Code | ... | Entry Code |
| Entity Name | Entity Name | ... | Entity Name |
| Range of State | Range of State | ... | Range of State |
| Variable 1.1 | Variable 2.1 | ... | Variable n.1 |
| Variable 1.2 | Variable 2.2 | ... | Variable n.2 |
| ... | ... | ... | ... |
| Variable 1.n | Variable 2.n | ... | Variable n.n |

The Data Matrix represents different Data Sets which represent different aspects of a given Entity, defined by n variables, when this is inside a certain Range of State.

c2) Definition of Conditions for Actions

The different actions that Entities have to represent when in a certain Range of State get defined by means of different rules of calculation and/or equations.

For example: IF VARIABLE 2.2 LESS THAN VARIABLE 1.1 THEN ACTION=GIANT AND JUMP.

c3) Definitions of Filters for Universe Selection & Calculation

Optionally and in order to filter the Importing of Entities, a range of Minimum and Maximum values can be defined for each data set. This can also be optionally defined to calculate total values of the resulting Universe.

External factors that are characteristics of the data sources can also be input at API into the DDPM (C.).

c4) Definition of the Temporary File

In a plain text form, a row for each record, and n columns with this data, separated by tabs:

*Col* 1: Entity Code

*Col* 2: Entity Name

*Col* 3: State Range

*Col* 4: Variable 1 Data Set 1

*Col* 5: Variable 2 Data Set 2

...

*Col n*: Variable *n* Data Set 1

*Col n* + 1: Variable 1 Data Set 2

*Col n* + 2: Variable 2 Data Set 2

...

*Col n* + *n*: Variable *n* Data Set *n*.

Figure 2:
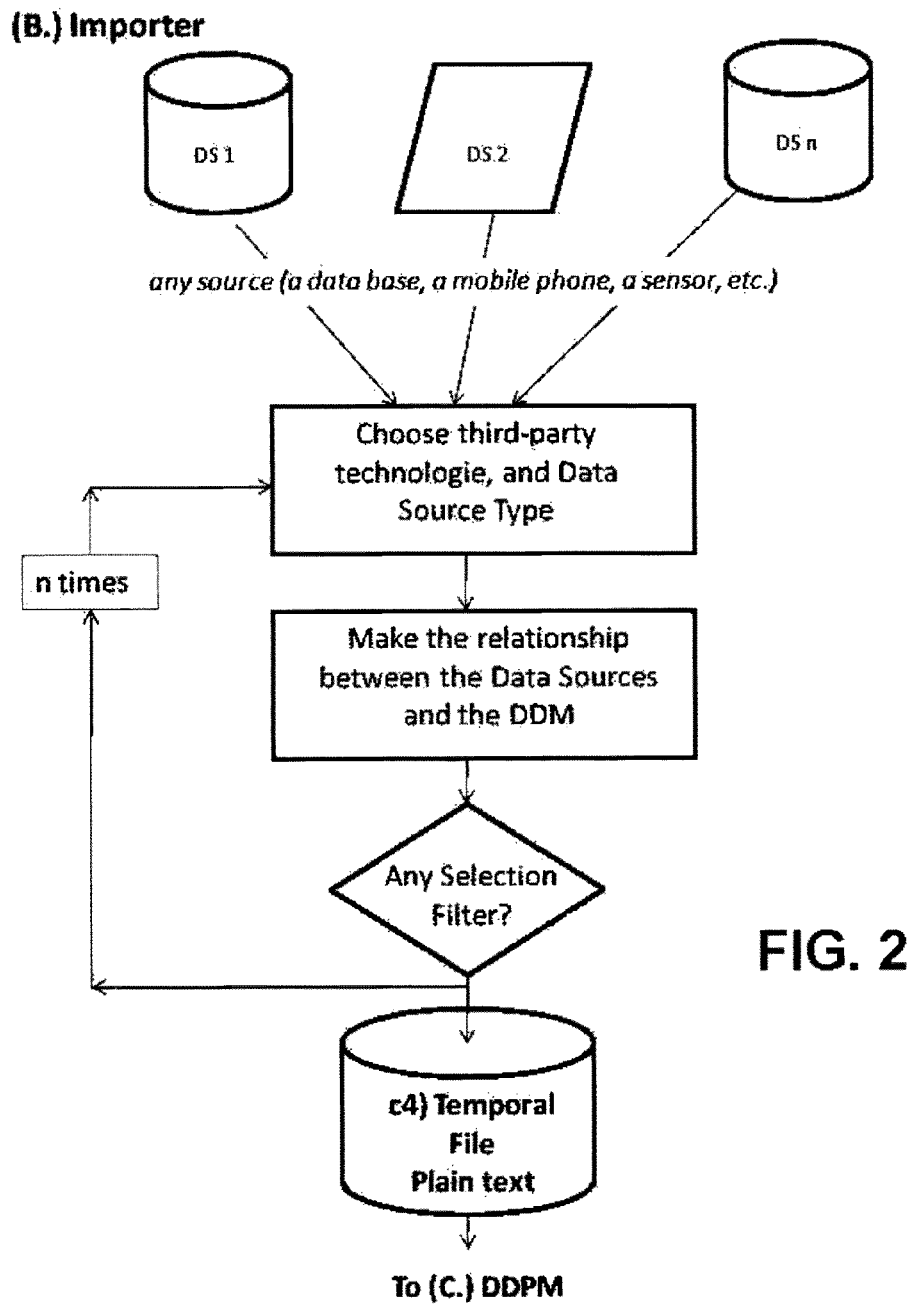
FIG. 2 is a flow chart showing the operation of the Importer module (B.) of the invention.

As shown in FIG. 2, the program, method and system of the invention includes, in the import module (B.), selecting a data source type from the data sets, establishing a relationship between the data sets and the processing of the data sets to take place in dynamic data processing matrix module, and filtering the data sets to create temporal files for the dynamic data processing matrix module, the dynamic data processing matrix module processing the temporal file to process the data sets in the dynamic data processing matrix module.

Figure 3:
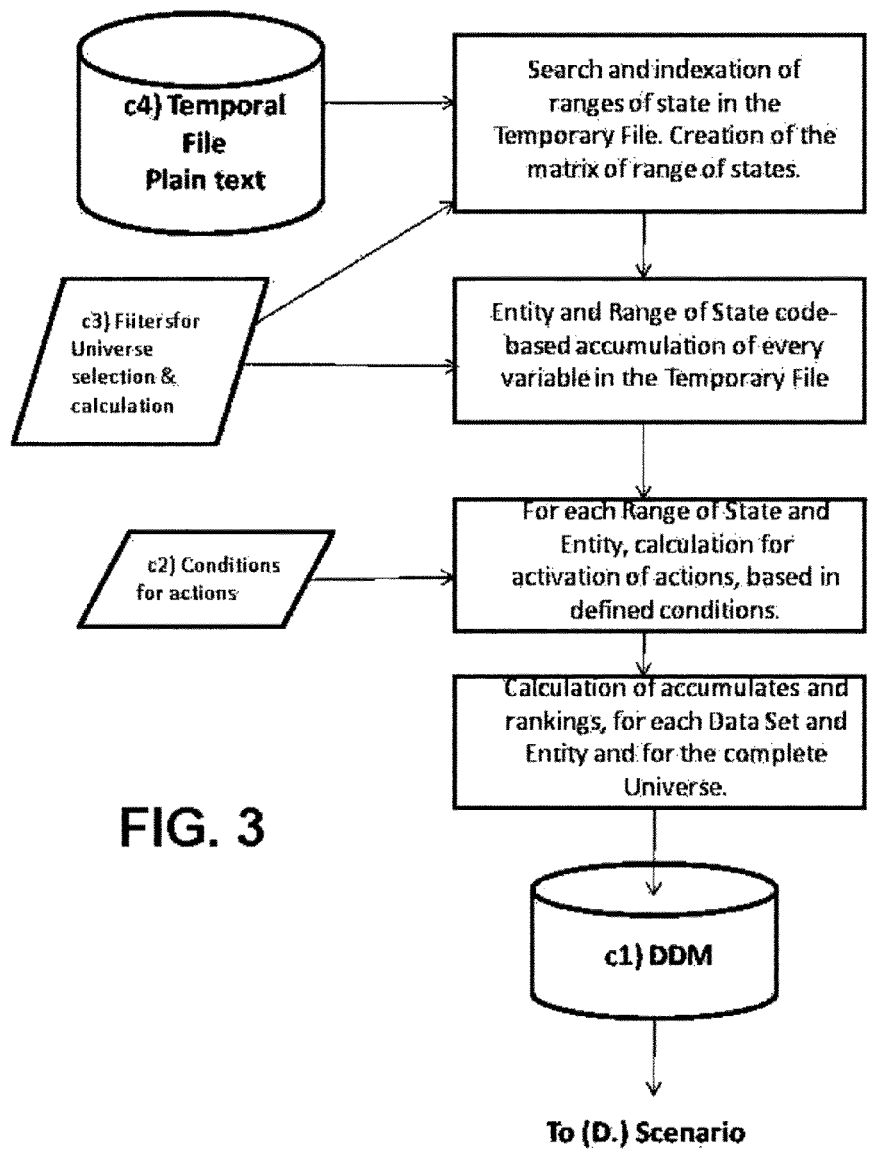
FIG. 3 is a flow chart showing the operation of the Dynamic Data Processing Matrix module or DDPM (C.) of the invention.

As shown in FIG. 3, in the dynamic data processing matrix module (C.), the step take place of: indexing range of states of variables in the temporal file, creating a matrix for range of states for the temporal file, accumulating code-based variables of the temporal file, and for each range of state calculating an activation action based on selected conditions of the virtual characters and environment for the scenario module.

Figure 4:
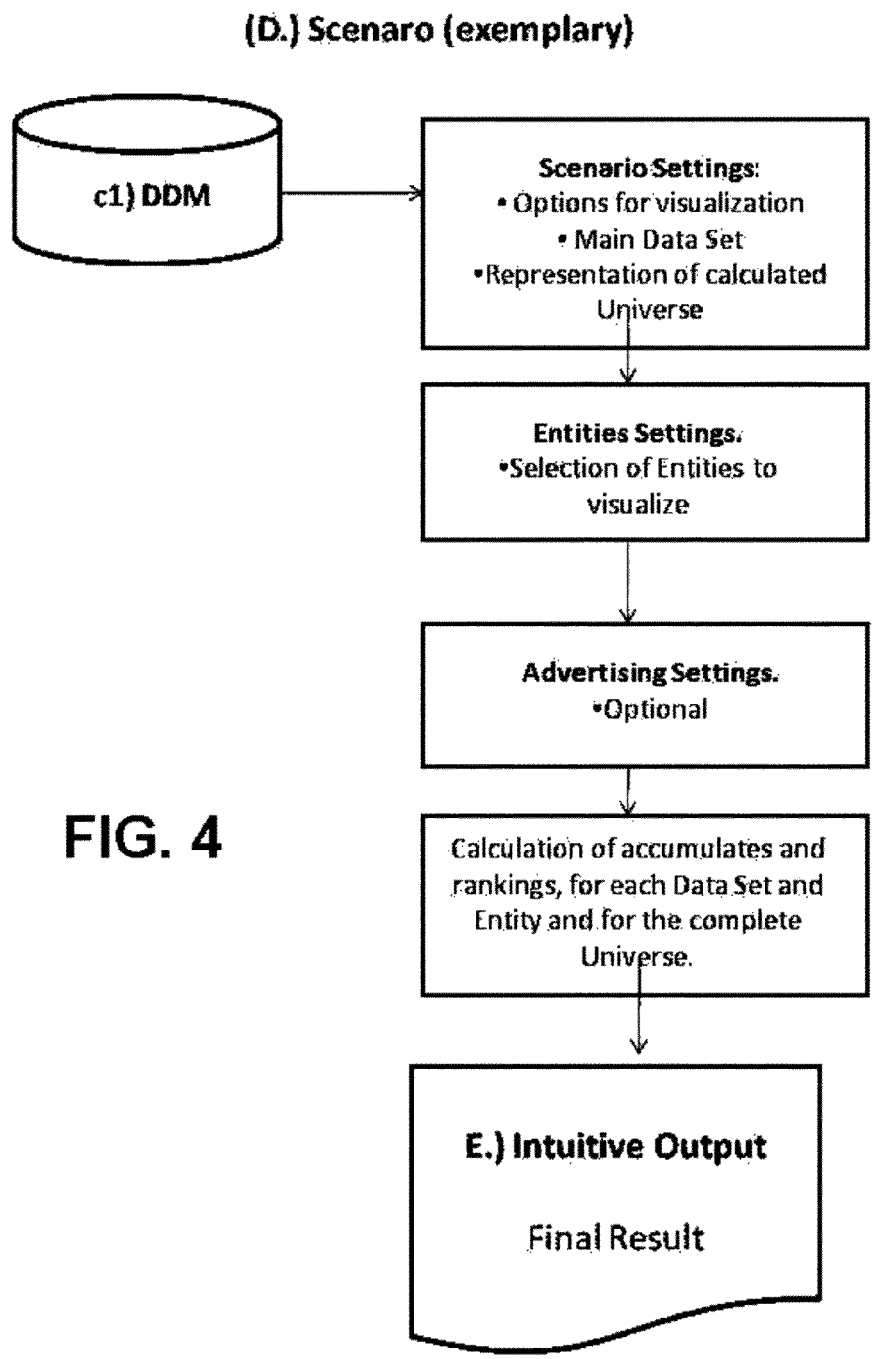
FIG. 4 is a flow chart showing the operation of the simulated reality or Scenario module (D.) of the invention.

As shown in FIG. 4, the scenario module (D.) functions to select entities of the virtual environment to form the virtual characters, and ranks the data sets for ascribing attribute or performance to the virtual characters based of the ranking.

Other functions of the modules that would be understood by those skill in the art of this invention are also illustrated is FIGS. 1-4

In the following, the invention is explained in the context of a foot race for the analysis of sales and margins.

Imagine that one wants to study one's customer purchases and comparing them with those of last year. On a spreadsheet one could represent this analysis using dynamic tables, bar graphs, pie charts, etc, etc. This is the traditional way the user has for finding relevant data. With the system, program and method of the invention, the data is represented as "a race" between sales representatives.

Figure 5:
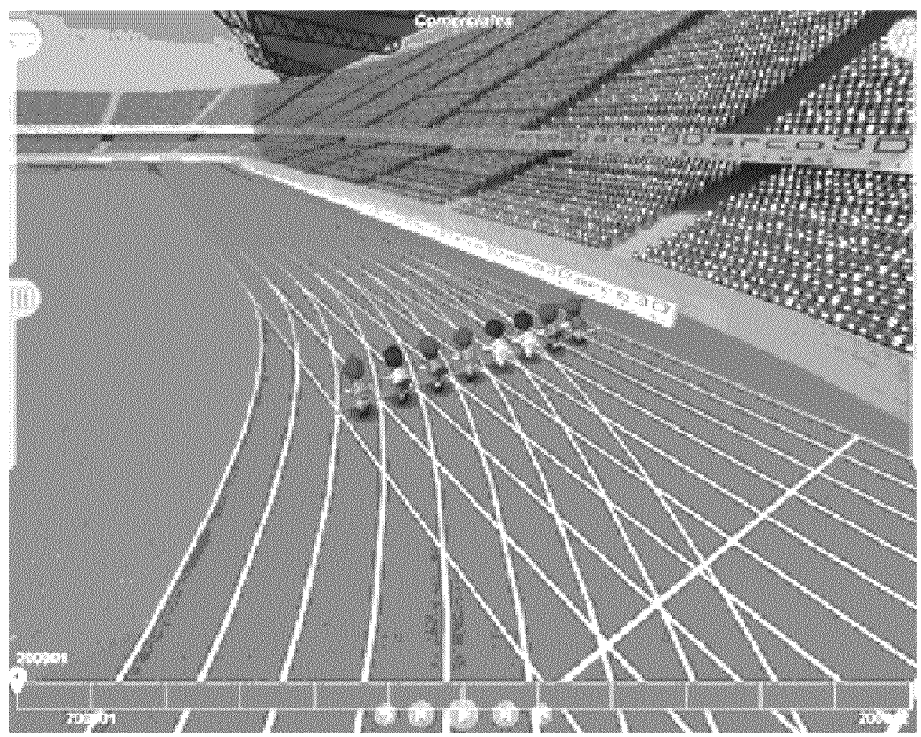
FIG. 5 is a snapshot of the visualization scheme where the user or viewer can change the "camera" or viewing angle to see different views of a virtual race that is an example of a virtual environment of the invention with runners forming the virtual characters.

FIG. 5 shows how the user or viewer can change the "camera" or viewing angle to see different views of a virtual race that is an example of a virtual environment of the invention where the runners represent the individual data or data sets.

Figure 6:
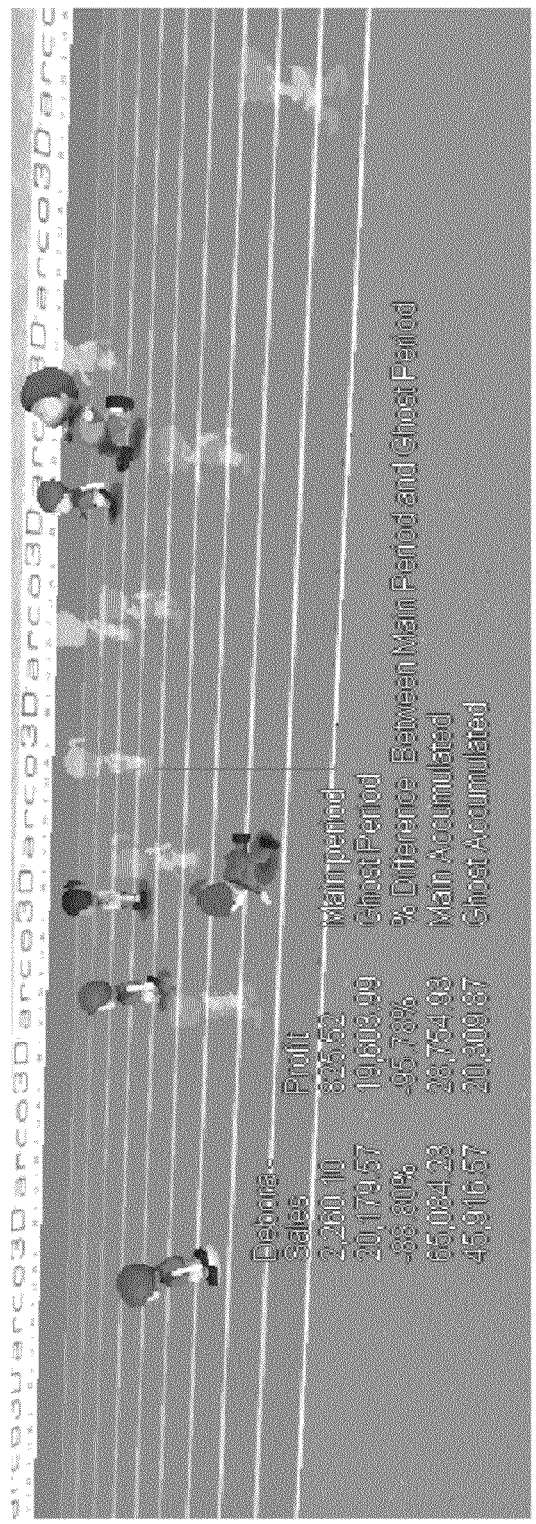
FIG. 6 is a snapshot of the visualization scheme of the invention where additionally, each virtual runner is paired with a Ghost, which represents the data from the previous year.

As shown in FIG. 6, each runner is paired with a Ghost, which represents the data from the previous year for example. In this way it is very easy and intuitive to see what is happening with the customers, how much they are purchasing and comparing, in a single Scenario, the relation to the other customers and the evolution in two different periods (this year _the runner_ and last year _the shadow_).

During the race, the runner may come across good or bad situations, which are here called Alarms. They are actions that represent things that occur during the period under study, such as a red or green traffic light on a control panel or dashboard of the display.

Figure 7:
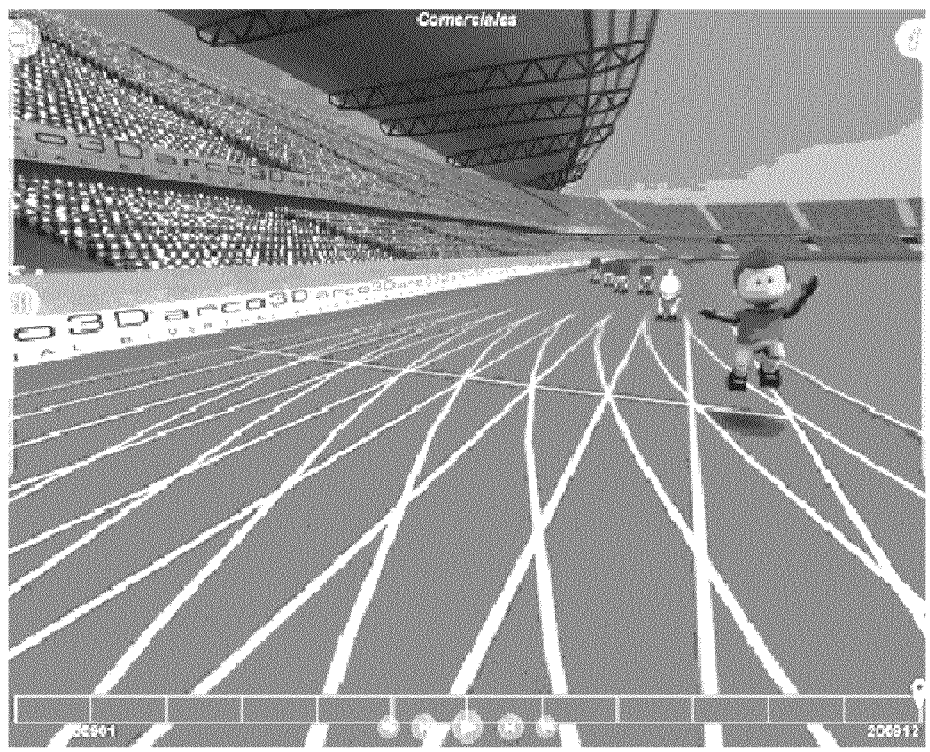
FIG. 7 is a snapshot of the visualization scheme of the invention showing how the invention can show the different variables in an intuitive Scenario.

With reference to FIG. 7, the system can show different variables in an intuitive Scenario:

This year's sales by month;

Last year's sales by month; and

Alarms, good or bad, during the period.

For example, if there is a decrease by an estimated % in relation to the same month of last year, the runner will fall in this part of the race or, instead, he will accelerate should the customer increase sales significantly during the period.

Figure 8:
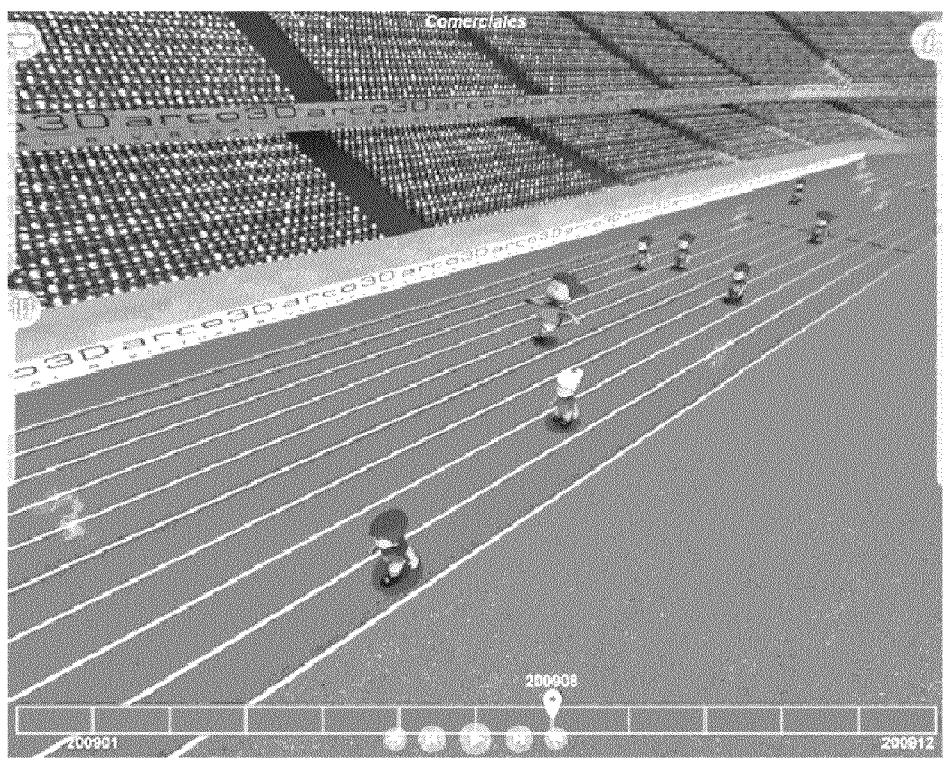
FIG. 8 is a snapshot of the visualization scheme of the invention showing how the method of the invention helps viewers analyze data, to make in-depth, "on-the-fly," discoveries of hidden information in the data.

FIG. 8 illustrates how the method of the invention helps viewers analyze data, to make in-depth, "on-the-fly," discoveries of hidden information or, at least, information that is difficult to find in traditional representations of data, all in an intuitive and fun environment, letting users make quicker and better decisions based on the data and relationships and interactions of the data that may not be apparent from graphs or charts that show the same data.

Other examples of the computer software program, method and system of the invention may use a field or a pitch or a rink of a sports venue with virtual players playing the relevant sport, each player having attributes or acting or performing according to the data each represents to graphically display the data to the viewer. The plural virtual characters need only be identifiable as players of the identifiable sport in the familiar virtual environment for that sport to give the user the correct context for understanding what the characters should be doing, and intuitively evaluating and understanding the data by observing the difference in attribute (e.g. size) or performance (e.g. speed) of that character.

The virtual environment may be other than a sporting even as long as plural characters may each be given attributes or be caused to perform in the context of the virtual environment and in a manner that is indicative of the data that character is visually displaying. Virtual people or animals or avatars around a table having a virtual conversation, or meal, or playing a game may be used, for example, in a manner that is indicative of the data or data set portrayed by each character. From the actions and interactions of the virtual characters in the context of the virtual environment, information about the nature and interactions of the data and data sets is quickly and intuitively appreciated by a viewer, since the viewer already knows at least partly what to expect in the context of the virtual environment, and appreciates that variations in the appearance or performance of each character is meant to visually represent a data set.

While specific embodiments of the invention have been shown and described in detail to illustrate the application of the principles of the invention, it will be understood that the invention may be embodied otherwise without departing from such principles.

What is claimed is:

1. A memory device containing a computer program for visualization of data sets from a data source, the computer program comprising:
   an import module for importing data sets from the data source;
   a dynamic data processing matrix module connected to the import module for processing the data sets for application to virtual characters of a virtual environment for visually representing the data sets;
   a scenario module connected to the dynamic data processing matrix module for generating the virtual characters and the virtual environment so that the virtual characters each have at least one of an attribute and a performance in the context of the virtual environment, that is indicative of a data set portrayed by each character respectively; and
   a graphic output connected to the scenario module for visually portraying the virtual characters with their attributes and performing in the context of the virtual environment, so that information about the data sets nature and interactions between the data set can be quickly and intuitively appreciated by a viewer of the graphic output.

2. The computer program of claim 1, wherein the virtual characters are players of a sport and the virtual environment is a venue for the sport.

3. The computer program of claim 1, wherein the virtual characters are runners and the virtual environment is a race track.

4. The computer program of claim 1, including, in the import module, selecting a data source type from the data sets, establishing a relationship between the data sets and the processing of the data sets to take place in dynamic data processing matrix module, and filtering the data sets to create temporal files for the dynamic data processing matrix module, the dynamic data processing matrix module processing the temporal file to process the data sets.

5. The computer program of claim 1, including; in the import module, selecting a data source type from the data sets, establishing a relationship between the data sets and the processing of the data sets to take place in dynamic data processing matrix module, and filtering the data sets to create temporal files for the dynamic data processing matrix module, the dynamic data processing matrix module processing the temporal file to process the data sets in the dynamic data processing matrix module; and in the dynamic data processing matrix module, indexing range of states of variables in the temporal file, creating a matrix for range of states for the temporal file, accumulating code-based variables of the temporal file, and for each range of state calculating an activation action based on selected conditions of the virtual characters and environment for the scenario module.

6. The computer program of claim 1, including; in the import module, selecting a data source type from the data sets, establishing a relationship between the data sets and the processing of the data sets to take place in dynamic data processing matrix module, and filtering the data sets to create temporal files for the dynamic data processing matrix module, the dynamic data processing matrix module processing the temporal file to process the data sets in the dynamic data processing matrix module; in the dynamic data processing matrix module, indexing range of states of variables in the temporal file, creating a matrix for range of states for the temporal file, accumulating code-based variables of the temporal file, and for each range of state calculating an activation action based on selected conditions of the virtual characters and environment for the scenario module; and in the scenario module, selecting entities of the virtual environment to form the virtual characters, and ranking of the data sets for ascribing attribute or performance to the virtual characters based of the ranking.

7. A method for graphically displaying a plurality of related data sets of a database to a viewer, comprising: generating a plurality of virtual characters for a virtual environment, each virtual character having an attribute or performing at a level in a context of the virtual environment that is indicative of one data set so that each of the data sets is portrayed by a virtual character; and causing the virtual characters to perform in the virtual environment for graphically displaying the data sets, the viewer viewing the attributes or performances or both of the virtual characters to access information about the data sets and interactions between the data sets.

8. The method of claim 7, wherein the virtual characters are players of a sport and the virtual environment is a venue for the sport.

9. The method of claim 7, wherein the virtual characters are runners and the virtual environment is a race track.

10. The method of claim 7, including, in an import module, selecting a data source type from the data sets in the database, establishing a relationship between the data sets and a processing of the data sets to take place in a dynamic data processing matrix module, and filtering the data sets to create temporal files for the dynamic data processing matrix module, the dynamic data processing matrix module processing the temporal file to process the data sets.

11. The method of claim 7, including; in an import module, selecting a data source type from the data sets in the database, establishing a relationship between the data sets and a processing of the data sets to take place in a dynamic data processing matrix module, and filtering the data sets to create temporal files for the dynamic data processing matrix module, the dynamic data processing matrix module processing the temporal file to process the data sets in the dynamic data processing matrix module; and in the dynamic data processing matrix module, indexing range of states of variables in the temporal file, creating a matrix for range of states for the temporal file, accumulating code-based variables of the temporal file, and for each range of state calculating an activation action based on selected conditions of the virtual characters and environment for the scenario module.

12. The method of claim 7, including; in an import module, selecting a data source type from the data sets of the database, establishing a relationship between the data sets and the processing of the data sets to take place in a dynamic data processing matrix module, and filtering the data sets to create temporal files for the dynamic data processing matrix module, the dynamic data processing matrix module processing the temporal file to process the data sets in the dynamic data processing matrix module; in the dynamic data processing matrix module, indexing range of states of variables in the temporal file, creating a matrix for range of states for the temporal file, accumulating code-based variables of the temporal file, and for each range of state calculating an activation action based on selected conditions of the virtual characters and environment for the scenario module; and in a scenario module, selecting entities of the virtual environment to form the virtual characters, and ranking of the data sets for ascribing attribute or performance to the virtual characters based of the ranking.

13. A memory device storing a system for the visualization of data sets from a data source, the system comprising:
   an import module for importing data sets from the data source;
   a dynamic data processing matrix module connected to the import module for processing the data sets for application to virtual characters of a virtual environment for visually representing the data sets;
   a scenario module connected to the dynamic data processing matrix module for generating the virtual characters and the virtual environment so that the virtual characters each have at least one of an attribute and a performance in the context of the virtual environment, that is indicative of a data set portrayed by each character respectively; and
   a graphic output connected to the scenario module for visually portraying the virtual characters with their attributes and performing in the context of the virtual environment, so that information about the data sets nature and interactions between the data set can be quickly and intuitively appreciated by a viewer of the graphic output.

14. The system of claim 13, wherein the virtual characters are players of a sport and the virtual environment is a venue for the sport.

15. The system of claim 13, wherein the virtual characters are runners and the virtual environment is a race track.

16. The system of claim 13, including, in the import module, selecting a data source type from the data sets, establishing a relationship between the data sets and the processing of the data sets to take place in the dynamic data processing matrix module, and filtering the data sets to create temporal files for the dynamic data processing matrix module, the dynamic data processing matrix module processing the temporal file to process the data sets.

17. The system of claim 13, including; in the import module, selecting a data source type from the data sets, establishing a relationship between the data sets and the processing of the data sets to take place in the dynamic data processing matrix module, and filtering the data sets to create temporal files for the dynamic data processing matrix module, the dynamic data processing matrix module processing the temporal file to process the data sets in the dynamic data processing matrix module; and
   in the dynamic data processing matrix module, indexing range of states of variables in the temporal file, creating a matrix for range of states for the temporal file, accumulating code-based variables of the temporal file, and for each range of state calculating an activation action based on selected conditions of the virtual characters and environment for the scenario module.

18. The computer program of claim 13, including; in the import module, selecting a data source type from the data sets, establishing a relationship between the data sets and the processing of the data sets to take place in dynamic data processing matrix module, and filtering the data sets to create temporal files for the dynamic data processing matrix module, the dynamic data processing matrix module processing the temporal file to process the data sets in the dynamic data processing matrix module; in the dynamic data processing matrix module, indexing range of states of variables in the temporal file, creating a matrix for range of states for the temporal file, accumulating code-based variables of the temporal file, and for each range of state calculating an activation action based on selected conditions of the virtual characters and environment for the scenario module; and in the scenario module, selecting entities of the virtual environment to form the virtual characters, and ranking of the data sets for ascribing attribute or performance to the virtual characters based of the ranking.

* * * * *